3,254,039
COPOLYMERS OF POLYESTER RESINS, STYRENE AND ACRYLAMIDE AND COATING COMPOSITIONS CONTAINING THE SAME
Harry Burrell and Herbert Behr, Cincinnati, Ohio, assignors to Interchemical Corporation, New York, N.Y.
No Drawing. Filed Mar. 15, 1962, Ser. No. 180,414
5 Claims. (Cl. 260—22)

This invention relates to new organic solvent soluble copolymers containing polyester resins, and more particularly to copolymers of polyester resins containing styrene and to coating compositions of said copolymers.

The novel copolymers of this invention are particularly useful in that in organic solvents they provide very durable surface coatings which are relatively inexpensive, exhibit excellent resistance to scratching, detergents, staining and washing, are flexible and display good adhesion to surfaces, especially metal surfaces. These novel copolymers may also be blended with a wide variety of copolymers and resins in organic solvents to provide coatings having the superior properties outlined above.

The novel copolymer of this invention comprises the addition polymerization product of (A) a preformed polyester resin comprising the condensation product of an ether glycol, an alpha-beta unsaturated dicarboxylic acid and a saturated dicarboxylic acid and (B) styrene. The resulting copolymers are soluble in organic solvents. The copolymers of this invention are quite different from "styrene-polyester resins" conventionally used in laminating, molding and casting applications. Such resins are solutions of polyesters or alkyd resins in monomeric styrene solvent. In these materials, any copolymerization which may take place between the styrene and the polyester does not take place until the composition is cured to an infusible insoluble thermoset material. Such resins are also known as "low pressure resins" or "contact resins."

The copolymers of this invention will be more fully described in the following specification, in which all proportions are by weight unless otherwise stated.

The copolymers of this invention show good pigment wetting power which makes easy the dispersion of pigments such as carbon black, titanium dioxide, phthalocyanines, etc. in vehicles containing these resins.

Two classes of novel copolymers made in accordance with this invention which have been found to be particularly useful in coating compositions are:

(1) Addition copolymers comprising the above described preformed polyester resin, styrene and an alpha-beta unsaturated monocarboxylic acid, particularly an acrylic acid such as methacrylic or acrylic acid. These copolymers are thermoplastic; and (2) Addition copolymers comprising the above described preformed polyester resin, styrene and alkylolated (preferably methylolated) acrylamide. These copolymers are thermosetting.

In accordance with this invention, novel coating compositions are prepared by blending the novel copolymers of class (1) which contain the acrylic acid with amine-aldehyde resins, and by using the alkylolated acrylamide containing copolymers of class (2) alone in coating compositions of volatile organic solvents which contain catalysts such as latent acid catalysts. These compositions will be considered in greater detail hereinafter.

The polyester resins used in the practice of this invention are prepared by a conventional condensation polymerization. Suitable ether glycols include diethylene glycol, triethylene glycol, and dipropylene glycol. Suitable saturated dicarboxylic acids include adipic acid, succinic acid, azelaic acid, sebacic acid, glutaric acid and pimetic acid.

The term alpha-beta unsaturated dicarboxylic acids as used in this invention is intended to include anhydrides, such as maleic anhydride. Other suitable alpha-beta unsaturated acids include maleic acid and fumaric acid.

It is preferable the alpha-beta unsaturated dicarboxylic acid content in the polyetser resin be such that the content of said acid in the final copolymer product does not exceed 10 mole-percent and is most preferably from 2 to 6 mole-percent. There are no critical limitations on the amounts of ether glycol or saturated dicarboxylic acid which may be incorporated into the polyester resin. Preferable proportions range from 5 to 50% for the ether glycol and from 10% to 70% for the saturated dicarboxylic acid.

It has been further found to be preferable to incorporate into the polyester resin a saturated fatty acid having a chain length of from 9 to 18 carbon atoms to control the chain length of said polyester resin. Suitable acids include pelargonic, lauric, myristic, palmitic and stearic acids. Most preferably, said saturated fatty acid comprises from 0 to 50% of said polyester resin.

The addition copolymerization of the polyester resin, the styrene and the other ethylenically unsaturated monomers is preferably conducted in solution and is initiated by "catalysts" or polymerization initiators of the free radical type. The most commonly used initiators are azo compounds and organic peroxygen compounds. Typical of the organic peroxygen compounds that may advantageously be used for this purpose are such compounds as peracetic acid, acetyl peroxide, perbenzoic acid, benzoyl peroxide, lauroyl peroxide, cumene peroxide, stearoyl peroxide, ditertiary butyl peroxide, tertiary butyl hydroperoxide, and methyl ethyl ketone-hydrogen peroxide adduct. Typical of the azo compounds that may be used for this purpose are azo-bisisobutyronitrile and azobisisovaleronitrile. As solvents where the polymerization is in solution, xylene, benzene, ethyl benzene, toluene, mixtures of xylene and butanol, aromatic petroleum naphthas, lower aliphatic alcohols, ketones and ethers may be used.

In addition to the polyester resin, styrene and acrylic acid or alkylolated acrylamide components, the novel copolymers of this invention may also contain other ethylenically unsaturated monomers such as acrylic esters including methyl methacrylate, ethyl acrylate, ethylhexyl acrylate and butyl acrylate, acrylamide, glycol methacrylate, vinyl alkyl ether, vinyl toluene, acrylonitrile and 2-hydroxymethyl-5-norbornene. Even acrylic acid e.g., acrylic or methacrylic acid may be included in the alkylolated acrylamide-containing reaction mixture.

The novel copolymers of this invention preferably contain from 10% to 40% of the preformed polyester resin, from 0 to 20% of methacrylic acid, from 0 to 20% of alkylolated acrylamide, 0 to 15% of other ethylenically unsaturated monomers and the remainder of the copolymer is styrene.

As previously mentioned, highly desirable thermoplastic copolymers for coating compositions are those comprising the polyester resin, styrene and an acrylic acid such as acrylic and methacrylic acids, preferably from 4 to 15% of said acid.

The novel alkylolated, preferably methylolated-acrylamide-containing thermosetting copolymers of this invention may be prepared either by (a) the addition polymerization of a mixture of the polyester resin, styrene and any other ethylenically unsaturated monomers with methylolated acrylamide, (b) the addition polymerization of the polyester resin, styrene and the other monomers with acrylamide and then reacting the resulting copolymer with formaldehyde in the conventional manner to methylolate the acrylamide component or preferably by (c) reacting formaldehyde with the acrylamide component during the polymerization of the mixture.

Since, according to a well known expedient, the formaldehyde which is used to methylolate the acrylamide may be used in the form of a solution in butanol or other lower alkanol so that etherification may take place in which at least some of the methylol groups would be converted to alkoxymethyl e.g., butoxymethyl groups, the term methylolated as used in the claims is meant to include alkoxymethethylated acrylamides. The primary purpose of the alkanol in this invention is to provide a solvent for acrylamide materials, and it is preferable that the etherification is held to a minimum.

While methylolated acrylamide made by reacting acrylamide groups with formaldehyde has been primarily mentioned, it is to be understood that other alkylolated acrylamides provide efficient alternatives. These are prepared by using other aldehydes such as furfural, butyraldehyde and acetaldehyde in place of formaldehyde.

The novel coating compositions which may be prepared in accordance with this invention will now be considered. As has been previously mentioned the novel copolymers comprising styrene, preformed polyester resin and an acrylic acid component provide excellent coating compositions when blended with amine-aldehyde resins. For a number of years it has been known that extremely hard thermosetting resins that are stain and scratch resistant can be made by reaction of an aldehyde (preferably formaldehyde) with a polyfunctional amine, such as urea, biuret, dicyandiamide, and triazines such as ammeline, melamine, substitute melamines, benzoguanamine, etc.

These resins are available commercially under trade names such as Uformite, Beckamine, Resimene, Aerotex, Cymel, etc. While these amine-aldehyde resins have proven to be very valuable in a number of applications, when used alone they are not satisfactory for most surface coating applications due to their poor adhesion to metal surfaces and to their poor flexibility.

It has been found that when blended with these acrylic acid-containing copolymers in an organic solvent, amine-aldehyde resins produce coating compositions which retain all of the desirable properties of amine-aldehyde resins and have, in addition, greatly improved adhesion and flexibility. Further, because of the large quantities of styrene which may be incorporated into the novel copolymer of this invention, such coating compositions may be produced at relatively low cost.

Highly desirable thermosetting coating compositions may be made by blending the novel copolymers of this invention with amine-aldehyde resins in solutions of organic solvents such as benzene xylene, ethyl benzene toluene, aromatic petroleum naphthas, lower aliphatic alcohols, ketones and ethers. Suitable amine-aldehyde resins include urea-formaldehyde resins, e.g., Beckamine P196 and Resimene U920 as well as resins made by the reaction of aldehydes and triazines of the classes described hereinabove e.g., butylated benzoguanamine-formaldehyde resins marketed under the trademark Uformite MX61 or melamine-formaldehyde resin e.g. Cymel 255-10.

Preferably ratios by weight on a solids basis in the range from 1:1 to 49:1 copolymer:amine-aldehyde are used.

Copolymers of the preformed polyester resin, styrene and methylolated acrylamide are capable of a wide variety of formulations into novel coating compositions. When used unblended in volatile organic solvents, these novel copolymers provide thermosetting coating compositions, particularly in the presence of an acid catalyst, particularly a latent acid catalyst. Two of such latent acid catalysts which have been found to be particularly effective are the pyridine and morpholine salts of p-toluene sulfonic acid. Among other acid catalysts which give desirable results are p-toluene sulfonic acid, oxalic acid, phthalic acid and hydrochloric acid.

The catalyst is present in small quantities preferably from 0.1 to 10% of the copolymer weight.

The cured films of the novel methylolated acrylamide-containing copolymers are mar-resistant, hard, flexible, display good adhesion to metal surfaces and are resistant to washing, to soaps and to detergents. The detergent resistance of the coating may be even further improved by blending with said novel copolymer an acrylic acid modified epoxide resin made by reacting the epoxide groups of a polyepoxide material, especially those made from dihydric phenols, epichlorohydrin in the presence of alkali, with acrylic or methacrylic acids. Polyepoxides that are available commercially for reaction with acrylic or methacrylic acid include: butadiene-1,3 diepoxide, diglycidyl ether, Epons, Aroalides, etc.

As noted above, the resinous polyepoxides prepared by reacting a dihydric phenol with epichlorohydrin in the presence of alkali are especially preferred for the present invention. More particularly, the resinous epoxides that have been found to be most effective are those having an epoxide equivalent between about 225 to 1025 and made by reacting 2,2-bis(hydroxyphenyl) propanes, especially 2,2-bis(4-hydroxyphenyl) propane or commercial mixtures of this isomer with minor quantities of the other isomers such as 2,2-bis(2-hydroxyphenyl) propane, e.g. Bisphenol A; in the presence of alkali. These materials are available commercially under the trade name "Epon." The polymers are believed to comprise alternate aliphatic chains, derived from epichlorohydrin and aromatic nuclei derived from bisphenol, connected by ether oxygens; the terminal aliphatic chains contain an epoxide group; and each interior aliphatic chain contains an aliphatic hydroxyl.

In carrying out the reaction between the epoxide containing material and the acrylic or methacrylic acid, the ratios of reactants are preferably one equivalent of epoxide to one equivalent of carboxyl, or a slight excess of the carboxyl over this ratio. This reaction takes place readily at temperatures on the order of 100° to 120° C. Generally a polymerization inhibitor, such as hydroquinone, in the reaction mixture will be desirable to inhibit the thermal polymerization of the product formed. It is to be noted, also, that the use of relatively low temperatures so as not to promote esterification of hydroxyl groups by carboxylic acids is desirable. It has been found that certain catalysts which catalyze the opening of the oxirane, or epoxide, ring will promote the desired reaction and minimize the possibility of gelation of the reaction mixture by undesirable side reactions. Particularly effective catalysts are tertiary amines, and N,N-dimethylbenzylamine is an especially preferred catalyst.

Preferably the acrylic acid modified epoxide resin constitutes from 3 to 20% on a solids basis of the total content of polymeric materials in the blend.

The following examples will illustrate the practice of this invention:

POLYESTERS—RESINS

Example A

| | Weight, g. |
|---|---|
| Triethylene glycol | 1200 |
| Adipic acid | 684 |
| Maleic anhydride | 196 |
| Pelargonic acid | 316 |

A mixture of the above ingredients is esterified into a polyester resin in the conventional manner by heating the mixture under a $CO_2$ atmosphere and agitation to 450° F. and maintaining said temperature until the acid number drops below 10. After 5 hours, the acid number is 5.2. The resulting polyester resin has a viscosity of W–X (Gardner-Holdt scale).

Example B

Example A is repeated using the same ingredients, conditions and proportions except that lauric acid is used in place of pelargonic acid. The resulting polyester resin has an acid number of 4.1 and a viscosity of T–U (Gardner-Holdt scale).

Example C

| | Weight, g. |
|---|---|
| Diethylene glycol | 424 |
| Adipic acid | 554 |
| Maleic anhydride | 20 |

A mixture of the above ingredients is esterified in the conventional manner by heating the mixture at 455° F. for about 6 hours. The resulting product has an acid number of 32.4.

Example D

| | Weight, g. |
|---|---|
| Triethylene glycol | 1800 |
| Adipic acid | 876 |
| Maleic anhydride | 294 |
| A mixture of stearic and palmitic acids having a free fatty acid content of 98.5% (calculated as oleic), a total fatty acid content of 102.5% (calculated as oleic) and an 0.5% polyunsaturated acid content | 840 |

The above ingredients are reacted in accordance with the procedure of Example A. The resulting polyester resin has an acid number of 4.8 and a viscosity of V–W (Gardner-Holdt scale).

Example 1

200 g. of a polymerizable mixture consisting of 20% by weight of the polyester resin of Example A, 4% methacrylic acid and 76% styrene are added to 500 g. xylol and 5 g. benzoyl peroxide and the mixture heated to reflux (at about 284° C.). While the mixture is maintained at reflux, an additional 780 g. of the above mixture are added over a period of 90 minutes after which an additional 500 g. of xylol and 10 g. of benzoyl peroxide are added over a period of 75 minutes. The mixture is maintained at reflux for 3 more hours after which 10 g. of benzoyl peroxide are added and heating at reflux is continued for 2 additional hours. Then 10 g. additional benzoyl peroxide are added and refluxing is continued for 2½ hours. The resulting copolymer solution has a viscosity of $Z_1$–$Z_2$ (Gardner-Holdt), an acid number of 15.6 and a solids content of 50.5% by weight.

The solution is compatible with amine-aldehyde resins. It is blended with Beckamine P196 (urea-formaldehyde resin) in a weight ratio (solids basis) of 7 parts of copolymer to 3 parts of said resin. Black iron panels are coated with this blend and then baked at 325° F. for 15 minutes. The resulting films have excellent hardness and adhesion and satisfactory flexibility.

Example 2

Example 1 is repeated using the same conditions, ingredients and proportions except that the polyester resin of Example B is substituted for the resin of Example A. The results are the same as those of Example 1.

Example 3

200 g. of a polymerizable mixture consisting of 30% by weight of the polyester resin of Example A, 5% of methacrylic acid and 65% styrene are added to 500 g. xylol and 5 g. benzoyl peroxide and the mixture is heated to reflux. While the mixture is maintained at reflux, an additional 800 g. of the above mixture are added over a period of 2 hours after which an additional 500 g. of xylol and 10 g. benzoyl peroxide are added over a period of ½ hour. Refluxing is continued for two more hours. The resulting copolymer has a viscosity of $Z_3$ and a solids content of 50% by weight.

The solution is compatible with amine-aldehyde resins. It is blended with Uformite MX61 (butylated benzoguanamine-formaldehyde resin) in a weight ratio (solids basis) of 7 parts of copolymer to 3 parts of said resin. Black iron panels are coated with this blend and then baked at 325° F. for 15 minutes. The resulting films have excellent hardness, adhesion and flexibility. They also display good mar resistance.

Example 4

200 g. of a polymerizable mixture consisting of 31% by weight of the polyester resin of Example C, 4% methacrylic acid, 15% glycol methacrylate and 50% styrene are added to 500 g. xylol and 5 g. benzoyl peroxide and the mixture is heated to reflux. While the mixture is maintained at reflux, an additional 800 g. of the above polymerizable mixture are added over a period of 90 minutes together with an additional 10 g. of benzoyl peroxide. Then 500 g. of xylol are added and the mixture is maintained at reflux for an additional hour, after which 500 g. of butanol are added and refluxing continued for another hour. 10 g. of benzoyl peroxide are added and refluxing is continued for 90 minutes. The resulting copolymer solution has a viscosity L–M (Gradner-Holdt) and a total solids content by weight of 39.2%.

The solution is compatible with amine-aldehyde resins. It is blended with Uformite MX61 (butylated benzoguanamine-formaldehyde resin) in a weight ratio (solids basis) of 7 parts of copolymer to 3 parts of said resin. Black iron panels are coated with this blend and then baked at 325° F. for 15 minutes. While the resulting films have satisfactory properties, they do not display adhesion, flexibility and mar resistance as good as that of the films of Example 1.

Example 5

300 g. of a polymerizable mixture consisting of 30% of the polyester of Example D, 62% styrene and 8% methacrylic acid are added to 750 g. of xylol, 250 g. of butanol and 7.5 g. of benzoyl peroxide and the mixture is heated to reflux. While the mixture is maintained at reflux, an additional 1200 g. of the polymerizable mixture are added over a period of 1 hour. The mixture is permitted to reflux for 1 hour after which 10 g. of benzoyl peroxide and 20 g. of butanol are added and the mixture is continued at reflux for 2½ hours. The resulting solution has a viscosity of $Z_5$ (Gardner-Holdt) and a 59% solids content.

The solution is compatible with amine-aldehyde resins. It is blended with Beckamine P196 (urea-formaldehyde resin) in a weight ratio (solids basis) of 7 parts of copolymer to 3 parts of said resin. Black iron panels are coated with this blend and then baked at 325° F. for 15 minutes. The resulting films have excellent hardness and adhesion and good flexibility.

Example 6

Example 5 is repeated using the same conditions, ingredients and proportions except that a polymerizable mixture comprising 40% of the polyester of Example D, 5% methacrylic acid and 55% styrene is substituted for the polymerizable mixture of Example 5.

The solution is compatible with amine-aldehyde resins. It is blended with Beckamine P196 (urea-formaldehyde resin) in a weight ratio (solids basis) of 7 parts of copolymer to 3 parts of said resin. Black iron panels are coated with this blend and then baked at 325° F. for 15 minutes. The resulting films have excellent hardness and good flexibility and mar resistance.

Example 7

300 g. of a polymerizable mixture consisting of 30% by weight of the polyester resin of Example D, 56% styrene and 14% methacrylic acid are added to 750 g. of xylol and 7.5 g. of benzoyl peroxide, and the mixture is heated to and maintained at reflux for 1 hour while 1200 g. of said polymerizable mixture are added. An additional 750 g. of xylol and 7.5 g. of benzoyl peroxide are then added while the mixture is maintained at reflux. Then 500 g. of butanol are added and the mixture is maintained at reflux for another hour. The resulting copolymer solution has a viscosity of V and a solids content of 42.4%.

The solution is compatible with amine-aldehyde resins. It is blended with Beckamine P196 (urea-formaldehyde resin) in a weight ratio (solids basis) of 7 parts of copolymer to 3 parts of said resin. Black iron panels are coated with this blend and then baked at 325° F. for 15 minutes. The resulting films have good hardness and adhesion as well as good flexibility and mar resistance.

Example 8

Example 1 is repeated using the same conditions, ingredients and proportions except that a polymerizable mixture of 25% polyester of Example A, 5% methacrylic acid, 5% acrylonitrile and 65% of styrene are substituted for the polymerizable mixture of Example 1.

The resulting film displays excellent adhesion, flexibility and mar resistance.

Example 9

A mixture of 54 g. of the polyester resin of Example D, 246 g. of styrene, 20 g. cumene hydroperoxide, 96 g. acrylamide, 48 g. paraformaldehyde, 0.3 g. NaNO₂, 0.06 g. NaOH, 300 g. butanol and 980 g. xylene is heated to reflux at 235° F. Then a mixture of 108 g. of the polyester resin of Example D, 494 g. of styrene and 40 g. of cumene hydroperoxide is added to the refluxing mixture over a period of one hour. The resulting mixture is permitted to reflux for another hour, at which point, 10 g. of benzoyl peroxide are added and the mixture maintained at reflux for an additional hour. 10 g. more of benzoyl peroxide are added and the mixture refluxed for 1½ hours. Another 10 g. of benzoyl peroxide are added and the mixture is permitted to reflux for 2½ hours, at which point 10 g. more of benzoyl peroxide are added. The mixture is then heated for 1½ additional hours. The mixture is cooled and filtered. The resulting copolymer solution has a viscosity of U+ (Gardner-Holdt) and a solids content of 45.8% by weight.

A cured coating of this copolymer may be produced by adding 1%, based on the total composition weight of 25% solution of p-toluene sulfonic in n-propanol and coating black iron panels with said composition. The panels are baked at 325° F. for 15 minutes. The resulting films have excellent adhesion, mar resistance and flexibility.

Example 10

|   | Weight, g. |
|---|---|
| Polyester resin of Example D | 450 |
| 2-hydroxymethyl-5-norbornene | 120 |
| Methacrylic acid | 60 |
| Styrene | 870 |
| Benzoyl peroxide | 22.5 |
| Solvesso 150 (an aromatic hydrocarbon solvent having a boiling range of 369° to 412° F. and a K.B. value of 92.1) | 750 |
| Butanol | 250 |

A monomer mixture is formed of the first four of the above items and 300 g. of said mixture is added to a mixture of the Solvesso 150, butanol and ⅓ of the benzoyl peroxide at reflux. While the mixture is maintained at reflux, the remaining monomer mixture is added over a period of 1 hour. Refluxing is continued for about four hours with the second and third ⅓'s of the benzoyl peroxide being added at equal time intervals. The resulting solution has a solids content of 56.1%, a conversion to polymer of 93.5% and a viscosity of Y+ (Gardner-Holdt scale).

Example 11

The copolymer solution of Example 5 is blended with amine-aldehyde resins as follows: 32 g. of the copolymer solution is blended on a three-roll mill with 13.1 g. of Uformite MX61 (butylated benzoguanamineformaldehyde resin) and 9 g. of Cymel 255-10 (isobutylated melamine-formaldehyde resin) together with 24.4 g. of TiO₂, 4 g. of Epon 1001, 2 g. of a 5% solution of ethyl hydroxy cellulose in toluene and 5 g. of xylol. Black iron panels are coated with this blend and then baked for 15 minutes at 325° F. The resulting white films display no discoloration, excellent hardness, flexibility, mar resistance and adhesion.

Example 12

The following materials are blended on a three-roll mill:

|   | Parts by weight |
|---|---|
| The copolymer solution of Example 9 | 66.6 |
| Xylene | 8.3 |
| Titanium dioxide pigment | 19.2 |
| 10% solution in 1:1 exylene:butanol solvent of the morpholine salt of p-toluene sulfonic acid | 1.0 |
| 56% solution in xylene of the reaction product of Epon 1001 [1] and methacrylic acid in the presence of a tertiary amine catalyst such as N,N-dimethylbenzyl amine, one equivalent or a slight excess of carboxyl being reacted for each equivalent of epoxide | 3.5 |

[1] Epon 1001 is an epoxy resin produced by the reaction of Bisphenol A and epichlorohydrin having a molecular weight of 875, an epoxide equivalent of 450-525 and a hydroxyl equivalent of 130.

Black iron panels are coated with the blend and then baked for 15 minutes at 325° F. The resulting white films display no discoloration and display better hardness, flexibility and adhesion properties than do the films of Example 11. This coating also has excellent detergent resistance.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:
1. An organic solvent soluble copolymer comprising the addition polymerization product of (A) polyester resin comprising the condensation polymerization product of triethylene glycol, maleic anhydride, adipic acid and a saturated fatty acid having a chain length of from 9 to 18 carbons, (B) styrene, and (C) acrylamide, in which product said acrylamide is methylolated.

2. The copolymer of claim 1 wherein the maleic anhydride content of the copolymer is from 2 to 6 molepercent.

3. A surface coating composition comprising a volatile organic solvent solution of the copolymer defined in claim 1.

4. A heat curable surface coating composition comprising a volatile organic solvent solution of the copolymer of claim 1 and an acid catalyst.

5. A heat curable surface coating composition comprising (A) a volatile organic solvent solution of the copolymer of claim 1, (B) an acid catalyst and (C) a resin made by reacting (1) the epoxide groups of a resinous epoxide having an epoxide equivalent between 225 and 1025 and made by reacting 2,2-bis(hydroxyphenyl) propane with epichlorohydrin with (2) an equivalent amount of an acrylic acid.

References Cited by the Examiner

UNITED STATES PATENTS

| | | | |
|---|---|---|---|
| 2,259,980 | 10/1941 | West | 260—21 |
| 2,598,664 | 6/1952 | Kropa | 260—22 |
| 2,855,373 | 10/1958 | Guenther | 260—850 |
| 2,919,253 | 12/1959 | Hart | 260—22 |
| 2,919,254 | 12/1959 | Christenson et al. | 260—22 |
| 2,940,945 | 6/1960 | Christenson et al. | 260—22 |
| 2,964,483 | 12/1960 | Johnson et al. | 260—855 |
| 3,037,963 | 6/1962 | Christenson et al. | 260—72 |
| 3,052,659 | 9/1962 | Woodruff | 260—80.5 |
| 3,088,926 | 5/1963 | Morris et al. | 260—834 |
| 3,102,868 | 9/1963 | Bolton et al. | 260—850 |
| 3,156,740 | 11/1964 | Bussell | 260—834 |
| 3,163,615 | 12/1964 | Sekmakas | 260—870 |

FOREIGN PATENTS 541,423   5/1957   Canada.

LEON J. BERCOVITZ, *Primary Examiner.*

R. W. GRIFFIN, F. McKELVEY, *Assistant Examiners.*